United States Patent
Meriac

(10) Patent No.: US 10,873,598 B2
(45) Date of Patent: Dec. 22, 2020

(54) METHOD FOR MITIGATING A DOS ATTACK ON A DEVICE

(71) Applicant: ARM IP Limited, Cambridge (GB)

(72) Inventor: Milosch Meriac, Cambridge (GB)

(73) Assignee: ARM IP Limited, Cambridge (GB)

( * ) Notice: Subject to any disclaimer, the term of this patent is extended or adjusted under 35 U.S.C. 154(b) by 213 days.

(21) Appl. No.: 15/433,288

(22) Filed: Feb. 15, 2017

(65) Prior Publication Data

US 2017/0237770 A1    Aug. 17, 2017

(30) Foreign Application Priority Data

Feb. 17, 2016 (GB) .................................. 1602801.1

(51) Int. Cl.
*H04L 29/06* (2006.01)
*H04L 29/08* (2006.01)

(52) U.S. Cl.
CPC ...... *H04L 63/1458* (2013.01); *H04L 63/0876* (2013.01); *H04L 63/10* (2013.01); *H04L 67/12* (2013.01)

(58) Field of Classification Search
CPC . H04L 63/0876; H04L 63/10; H04L 63/1458; H04L 67/12
See application file for complete search history.

(56) References Cited

U.S. PATENT DOCUMENTS

| | | | |
|---|---|---|---|
| 7,886,334 B1* | 2/2011 | Walsh | G06Q 10/00 713/166 |
| 2014/0259145 A1 | 9/2014 | Khandelwal et al. | |
| 2015/0007273 A1* | 1/2015 | Lin | H04L 63/08 726/4 |
| 2015/0096020 A1* | 4/2015 | Adams | H04L 63/1458 726/23 |
| 2017/0163647 A1* | 6/2017 | Cernoch | G06F 21/44 |

OTHER PUBLICATIONS

Combined Search and Examination Report for GB1602801.1 dated Aug. 9, 2016, 8 pages.
Nir, "Using Client Puzzles to Protect TLS Servers From Denial of Service Attacks", *TLS Working Group—Internet Draft*, Apr. 29, 2014, 8 pages.
Examination Report for GB Application No. 1602801.1 dated Jul. 4, 2019, 5 pages.
Examination Report for GB Application No. 1602801.1 dated Oct. 16, 2019, 3 pages.

* cited by examiner

*Primary Examiner* — Tri M Tran
(74) *Attorney, Agent, or Firm* — Nixon & Vanderhye P.C.

(57) ABSTRACT

There is described a method for mitigating a power-denial of service attack on a first device by a second device, the method comprising: transmitting, from the first device to the second device, a first communication comprising a first task to be solved by the second device; receiving, at the first device from the second device, a second communication comprising one of a proposed solution to the first task and at least one trust credential; verifying, at the first device, the second communication; responsive to an unsuccessful verification of the second communication, transmitting, from the first device to the second device a third communication comprising a second task to be solved by the second device.

14 Claims, 12 Drawing Sheets

Figure 1:
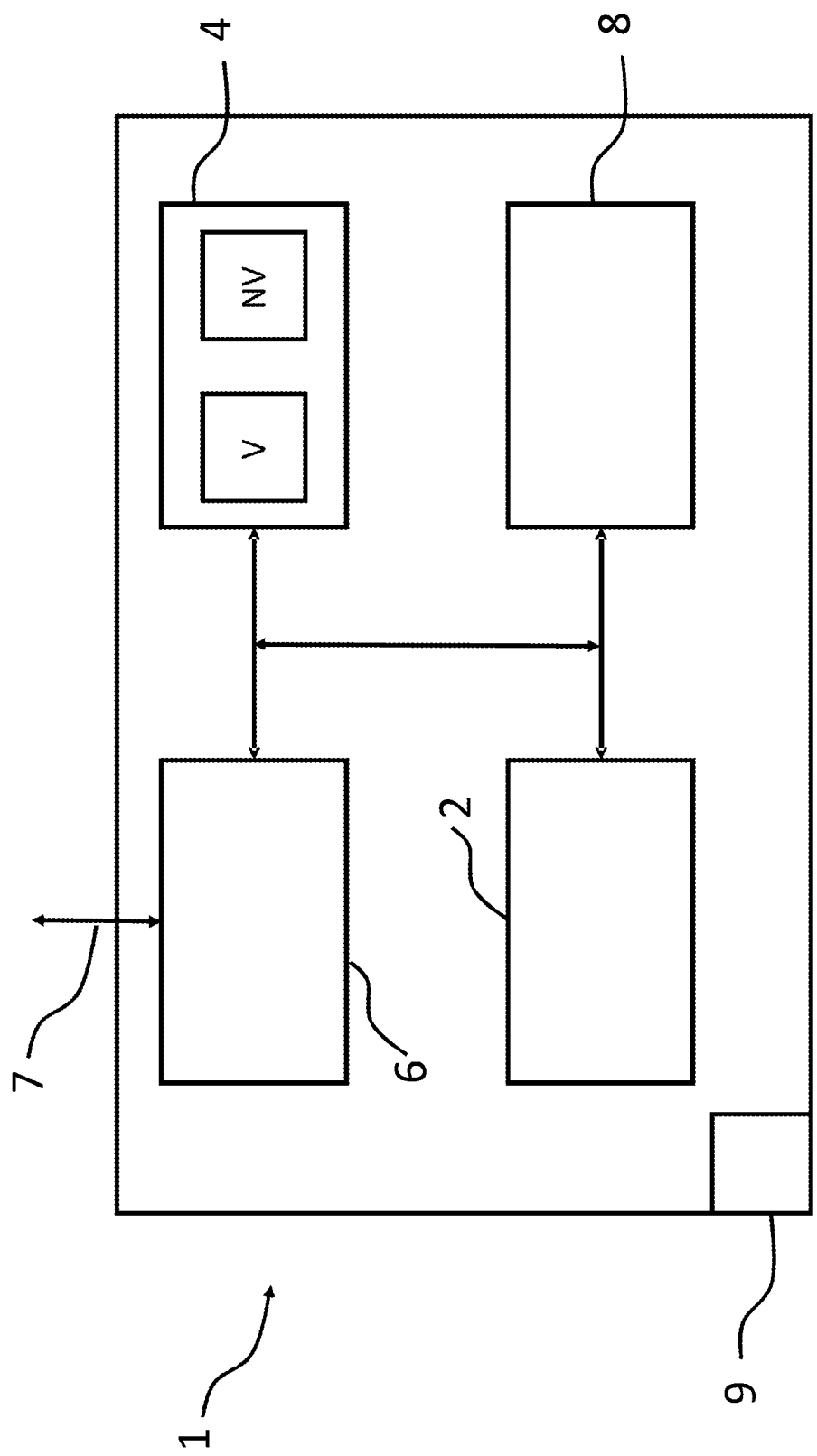

| Device | Specified Time Limit (Seconds) |
|---|---|
| 10a | 59 |
| 10b | 40 |
| 10c | 80 |
| 10d | 30 |
| ... | |
| 10j | 61 |
| 10k | 90 |
| ... | |
| 10s | 42 |
| 10t | 05 |
| ... | |
| 10z | 32 |

Table 1

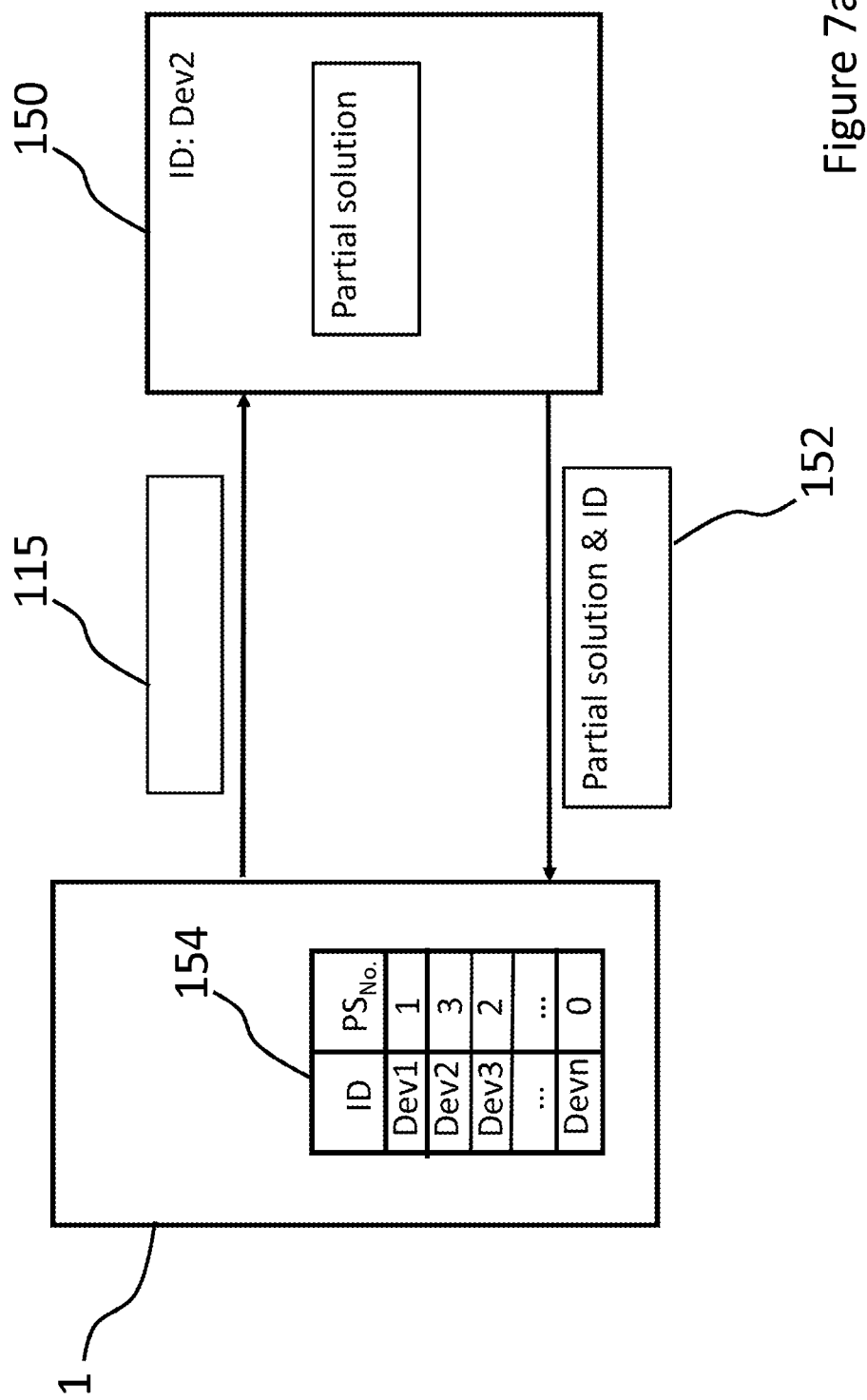

METHOD FOR MITIGATING A DOS ATTACK ON A DEVICE

This application claims priority to GB Patent Application No. 1602801.1 filed Feb. 17, 2016, the entire content of which is hereby incorporated by reference.

The present techniques relate to communications between data processing devices, and particularly, but not exclusively, to mitigating denial-of-service (DoS) attacks on such data processing devices.

There are ever increasing numbers of data processing devices within, for example, the home, office buildings or the outdoor environment that have processing and communication capabilities which allow for interaction between such data processing devices, objects and cloud services as part of the "Internet of Things" (IoT).

For example, a heating system in the home may gather information from various temperature sensor devices and control the activation of heaters based on the gathered information; a factory pollution monitoring sensor device may gather information from various chemical sensors and arrange maintenance via a connected device based on the gathered information; a fridge may gather data relating to products within the fridge and update a user as to stock levels, best before dates etc. (e.g. via the user's smartwatch or smartphone); whilst a door-lock device may communicate with an authorised device (e.g. a user's smartphone) to validate the authorised device and unlock one or more associated doors.

Although data processing devices in IoT applications may comprise large scale data processing devices, such as a tablet computer or mobile telephone, often such devices comprise a relatively small scale data processing device such as an embedded computer in an object such as a watch, door, vending machine, locker, fridge, lightbulb, television etc.

In IoT applications, such data processing devices, hereinafter "IoT devices" generally have limited processing power and minimal security capabilities such that they tend to be vulnerable to a denial-of-service (DoS) attack by a $3^{rd}$ party, whereby, for example an attacker may overload the IoT device with requests to access device such that other devices cannot access the IoT device or with requests for the IoT device to perform a specific action thereby, for example, draining the battery power or, in some embodiments, overloading resources of the IoT device (e.g. CPU computing power), as part of a power-DoS attack.

Conventional systems using client-server configurations (such as that disclosed by Internet Engineering Task Force (IETF), TLS Working Group, "draft-nir-tls-puzzles-00", of 29 Apr. 2014) require clients to perform a proof-of-work exercise when the server detects an unusual load.

The present techniques seek to mitigate the above mentioned problem of DoS attacks such as power-DoS attacks, on IoT devices (e.g. mitigate the risk, likelihood, number of, severity and/or effects thereof), and to generally reduce the number of unwanted communications being sent thereto from rogue devices in an improved manner in comparison to conventional systems.

According to a first technique, there is provided a method for mitigating a denial of service attack on a first device by a second device, the method comprising: transmitting, from the first device to the second device, a first communication comprising a first task to be solved by the second device; receiving, at the first device from the second device, a second communication comprising one of a proposed solution to the first task and at least one trust credential; verifying, at the first device, the second communication; responsive to an unsuccessful verification of the second communication, transmitting, from the first device to the second device a third communication comprising a second task to be solved by the second device.

According to a second technique, there is provided a method of establishing a connection between a first device and a second device, the method comprising: receiving, at the first device from the second device, a first communication comprising a task to be solved, wherein the task to be solved is seeded with a device identifier of the first device; generating, at the first device, a proposed solution to the task; transmitting, from the first device to the second device, a second communication comprising the proposed solution; receiving, at the first device from the second device, a third communication as part of a connection negotiation protocol; establishing a connection between the first device and the second device.

According to a third technique, there is provided a method for mitigating a denial of service attack on a first device by a second device, the method comprising: transmitting, from the first device to the second device, a first communication comprising a task to be solved by the second device; generating, at the second device, a proposed solution to the task; transmitting, from the second device to the first device, a second communication comprising the proposed solution; verifying, at the first device, the second communication; responsive to an unsuccessful verification of the second communication, transmitting, from the first device to the second device a third communication comprising a second task to be solved by the second device.

Figure 2:
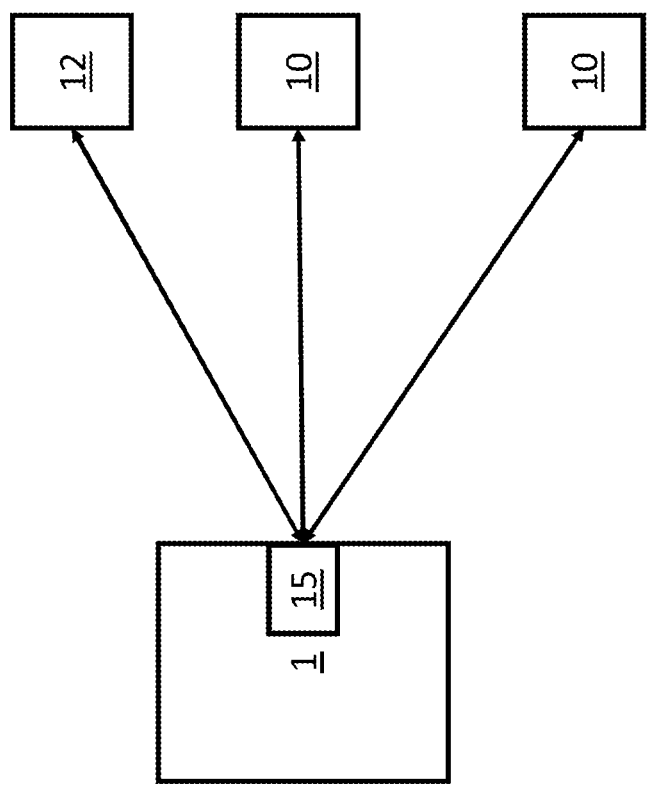
Figure 3B:
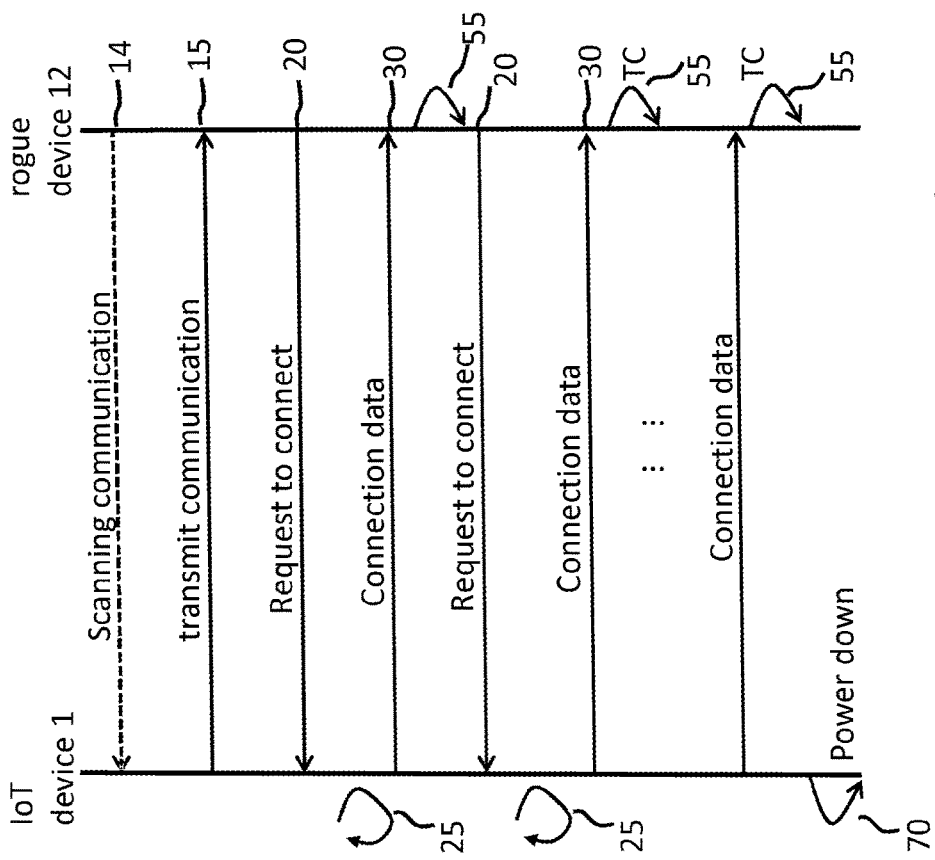
Figure 3A:
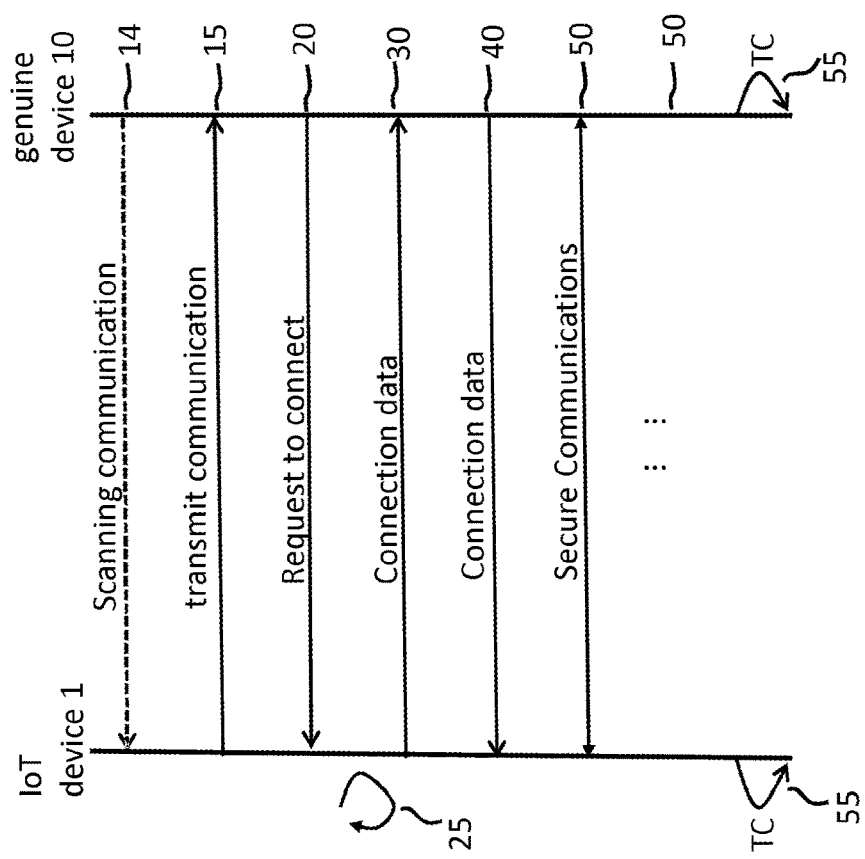
Figure 4A:
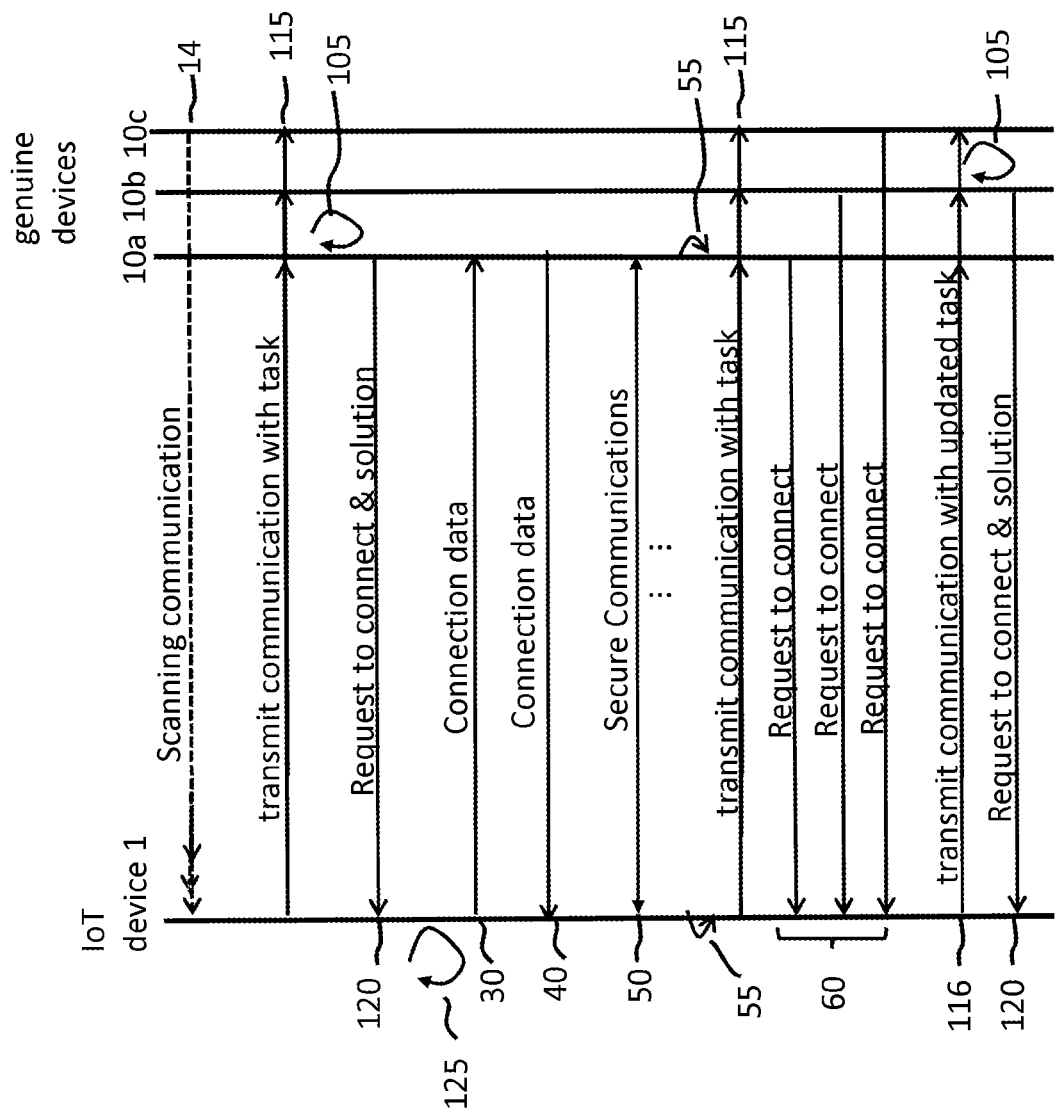
Figure 4B:
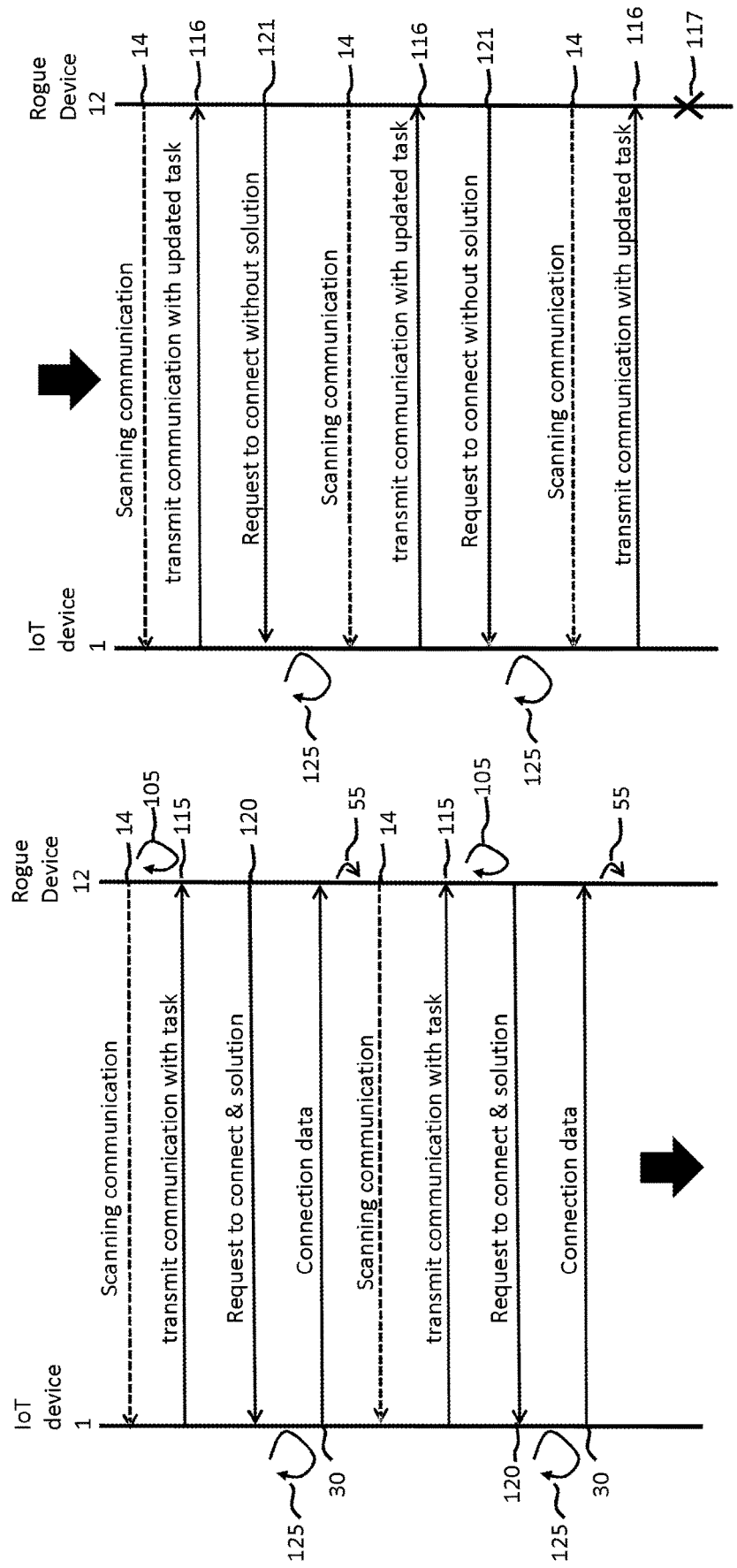
Figure 5A:
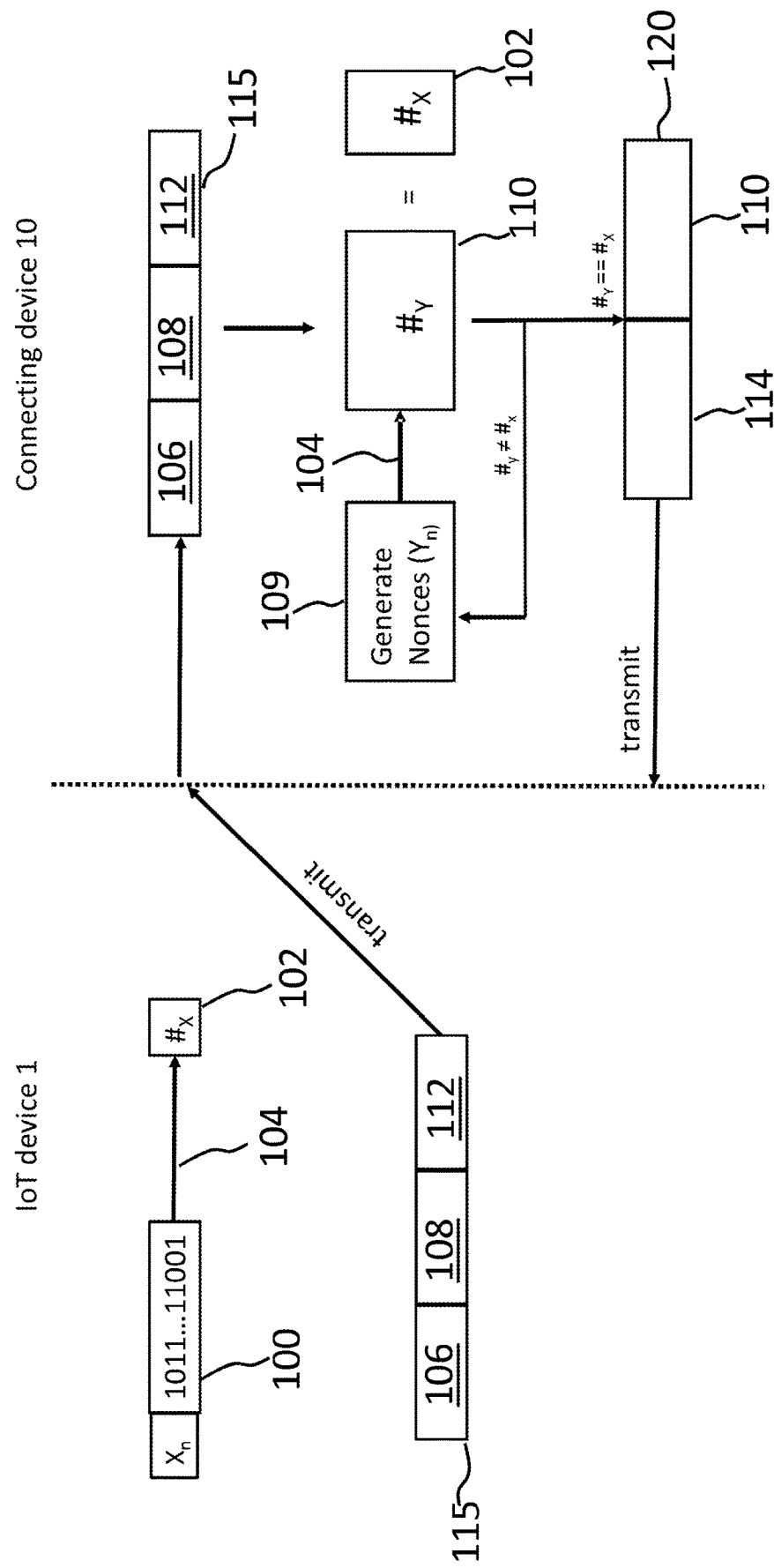
Figure 5B:
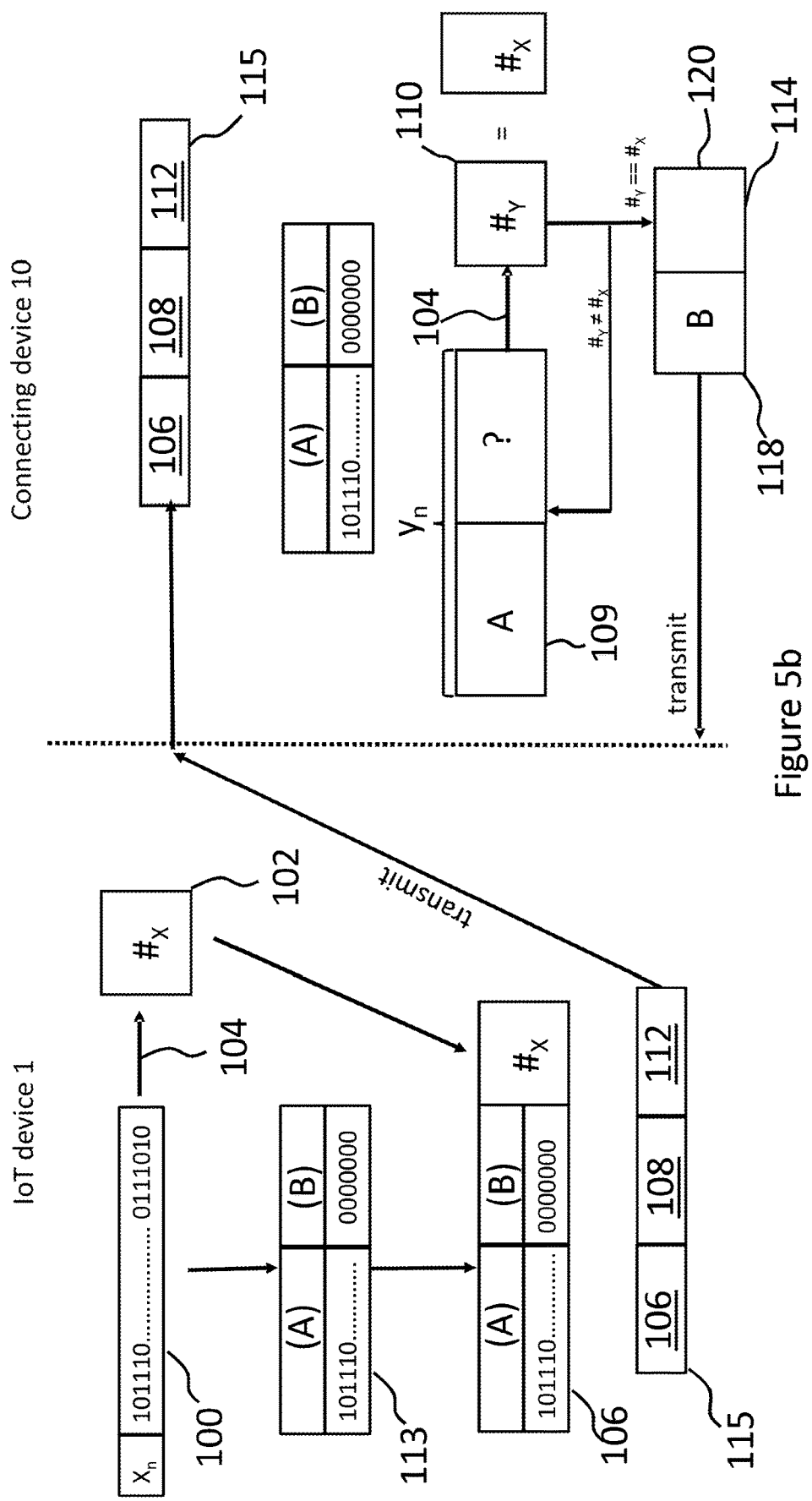
Figure 5C:
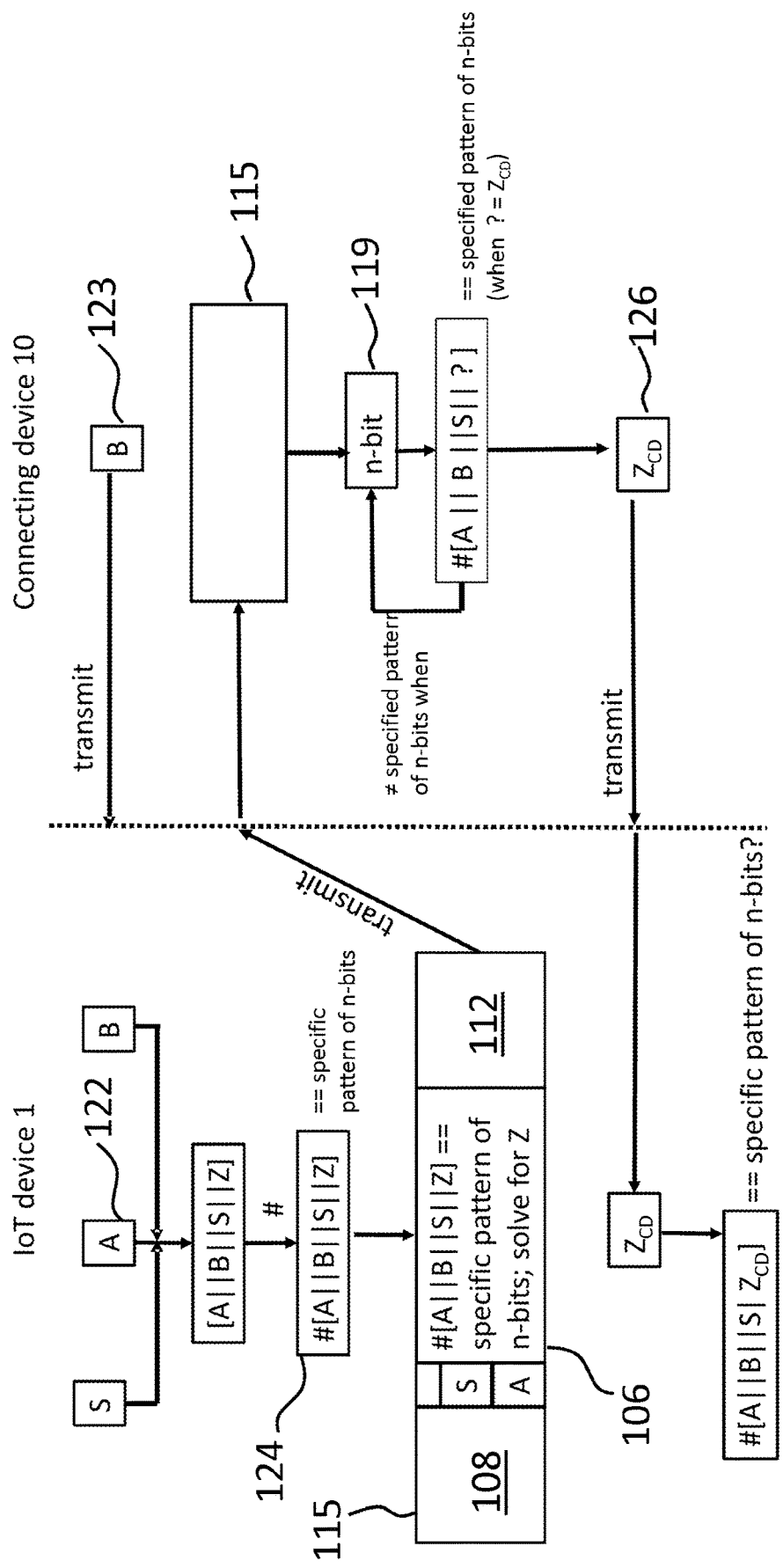
Figure 6:
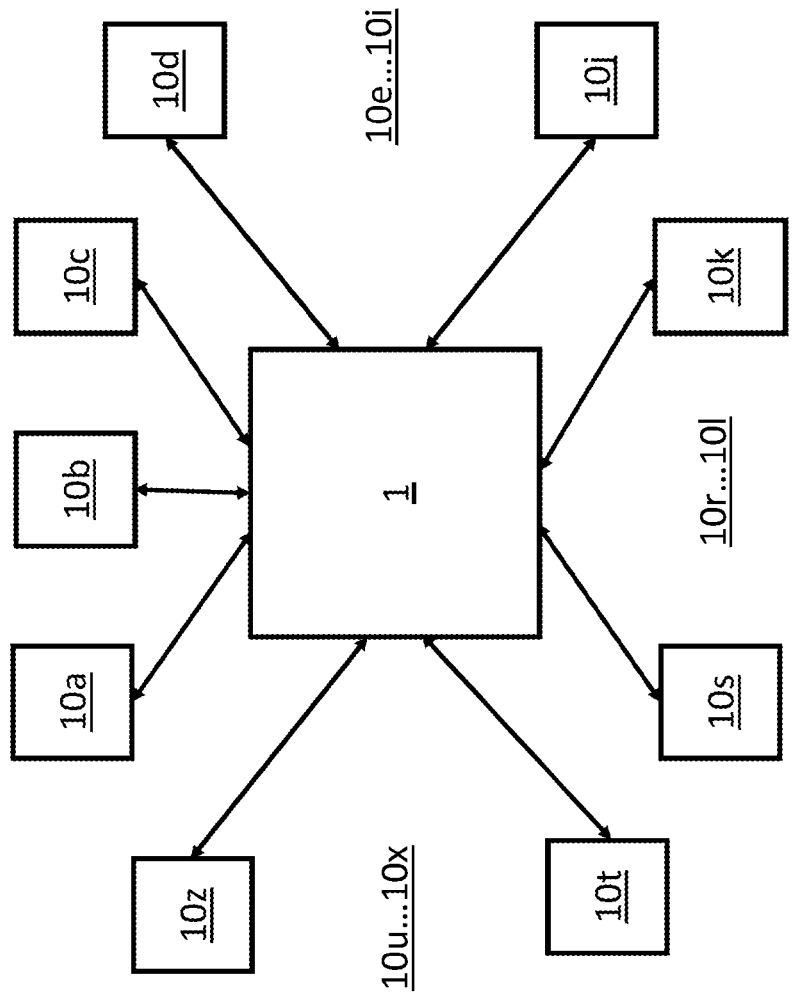
Figure 7B:
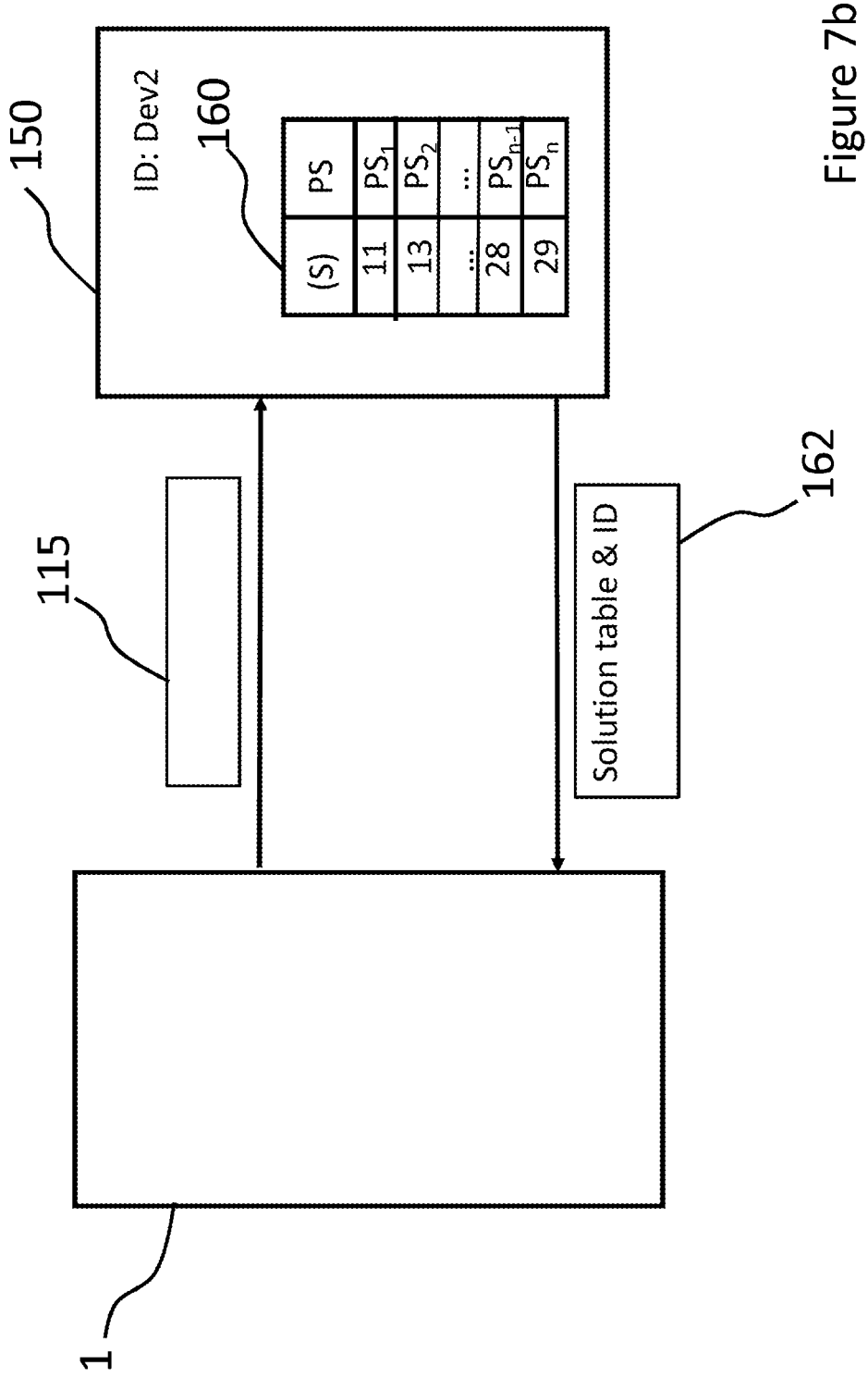
Figure 8:
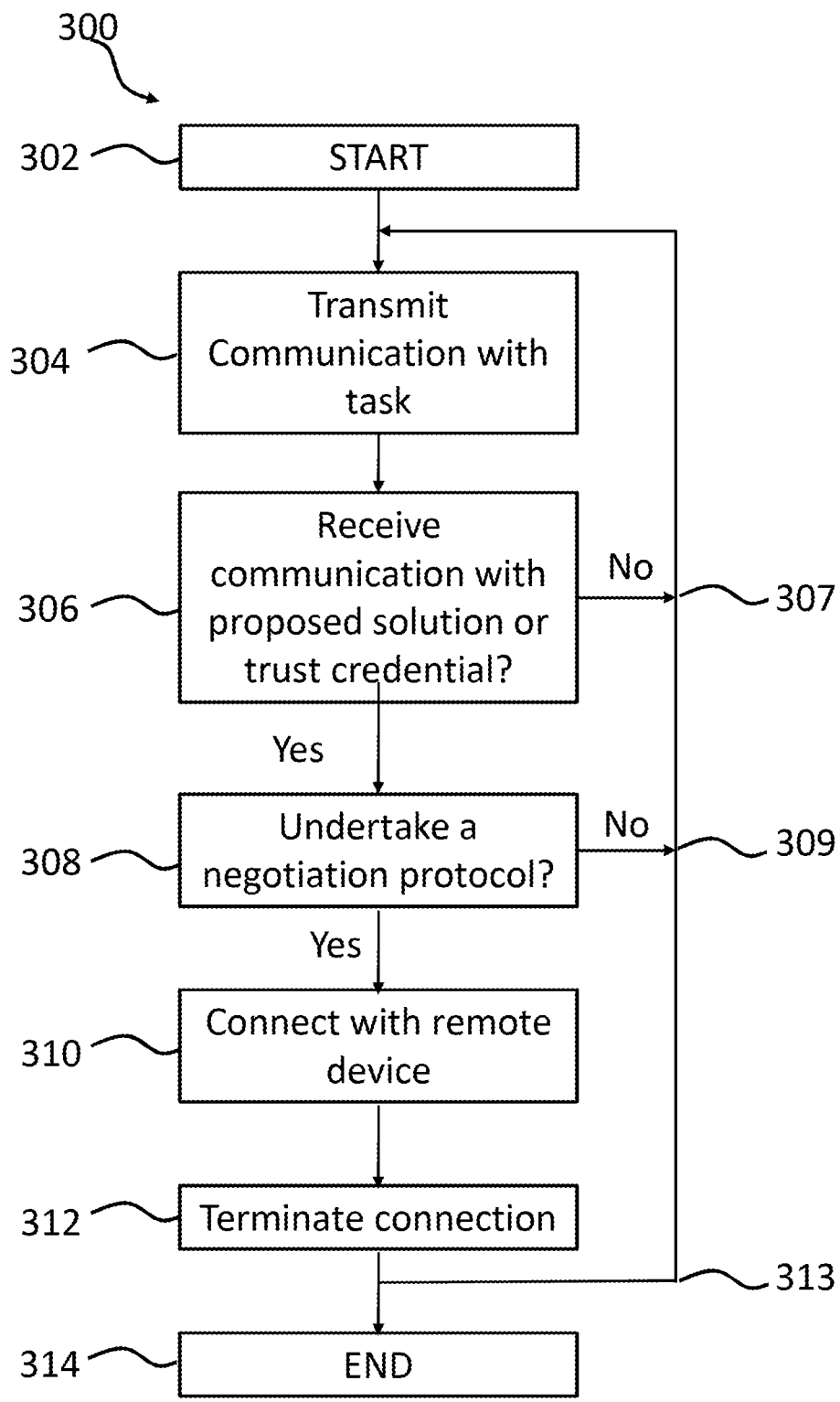

Embodiments will now be described with reference to the accompanying figures of which:

FIG. 1 schematically shows an example of an IoT device;

FIG. 2 schematically shows a plurality of data processing devices within wireless communication range of the IoT device of FIG. 1;

FIG. 3a schematically shows example communications between the IoT device of FIG. 1 and a genuine device;

FIG. 3b schematically shows example communications between the IoT device of FIG. 1 and a rogue device;

FIG. 4a schematically shows example communications comprising a task between the IoT device of FIG. 1 and a genuine device;

FIG. 4b schematically shows example communications comprising a task between the IoT device of FIG. 1 and the rogue device of FIG. 3b;

FIG. 5a schematically shows an example of a task generated by the IoT device of FIG. 1;

FIG. 5b schematically shows an example of a different task generated by the IoT device of FIG. 1;

FIG. 5c schematically shows a further example of a different task generated by the IoT device of FIG. 1;

FIG. 6 schematically shows a plurality of connecting devices attempting to connect to the IoT device of FIG. 1;

FIG. 7a schematically shows the IoT device of FIG. 1 in communication with an NC-device;

FIG. 7b schematically shows the IoT device of FIG. 1 in communication with the NC-device of FIG. 7a according to a further embodiment; and FIG. 8 schematically shows a flowchart of the IoT device of FIG. 1 connecting with a remote device.

FIG. 1, schematically shows an example of an IoT device 1, for use with the present techniques.

The IoT device 1 of FIG. 1 includes processing circuitry 2 coupled to storage 4, communication circuitry 6 and input/output (I/O) circuitry 8.

The processing circuitry 2 may be configured to carry out instructions of a program by performing the basic arithmetic, logical, control and input/output (I/O) operations specified by the instructions.

The storage 4 may comprise, for example, memory circuitry 4 having volatile (V) memory (e.g. RAM) and non-volatile (NV) memory (e.g. flash or ROM). The memory circuitry 4 may store the programs executed by the processing circuitry 2, as well as data such as credentials. Such credentials may include device identifiers (ID) and/or shared secret(s), for example, a cryptographic key (e.g. a public/private key pair, or symmetric key, or seed value/number) for authentication/encryption of communications transmitted from and/or received at the IoT device 1.

The communication circuitry 6 may be provided to communicate with remote devices (not shown in FIG. 1). The communication circuitry 6 may use wireless communication 7, such as, for example, wireless local area network (e.g. WiFi), short range communication such as radio frequency identification (RFID), near field communication (NFC) or communications used in wireless sensor networks such as ZigBee, Thread, Bluetooth and/or Bluetooth Low energy (BLE). Also the communication circuitry 6 may use a cellular network such as 3G or 4G. The communication circuitry 6 may also use wired communication (not shown) such a fibre optic or metal cable. The communication circuitry 6 could also use two or more different forms of communication, such as several of the examples given above in combination.

The I/O circuitry 8 may comprise sensing circuitry to sense inputs from the surrounding environment and/or to provide an output to a user e.g. using a buzzer or light emitting diode(s) (not shown). The IoT device 1 may generate operational data based on the sensed inputs, whereby the operational data may be stored in the memory circuitry 4 and processed by the processor circuitry 2. The I/O circuitry 8 may also comprise a user interface (e.g. buttons) to allow the user to interact with the IoT device 1. Furthermore, the IoT device 1 may comprise a display e.g. an organic light emitting diode (OLED) display, for communicating messages to or receiving inputs from a user.

The IoT device 1 also comprises a power source 9 such as a battery (e.g. a lithium coin cell), although any suitable power source may be used (e.g. an AC mains supply, solar power supply etc.).

It will be appreciated that the IoT device 1 may comprise other hardware/software components not described herein depending on the specific functionality of the IoT device 1. For example, the IoT device 1 may comprise a fitness band having an embedded global positioning system (GPS) to capture and record movement of a user and to generate operational data accordingly.

FIG. 2 schematically shows data processing devices 10, 12, in communication range of IoT device 1, such that devices 10, 12 and IoT device 1 may communicate data and/or exchange data with each other using a suitable communications protocol e.g. BLE, Bluetooth, ZigBee. Like reference numerals used previously will be used to describe like features as appropriate.

As an illustrative example, the IoT device 1 may generate a communication 15 which includes details relating to the IoT device 1, for example: identification details; capability/functionality details; protocol details; and/or status details thereof. Other details not specifically described may also be included in the communication 15.

The communication 15 may comprise one or more messages, the messages(s) having packets of data or a bit stream.

In the following examples, the communication is described as a broadcast communication 15, but it will be understood that any suitable type of communication may be used e.g. unicast, multicast etc.

The identification details may include a device identifier such as a globally unique identifier (GUID), MAC address, IPv4/IPv6 address etc.

The capability/functionality details may comprise code, in the form of a GUID, unique numeric ID (UNID), which defines the capabilities and functionalities of the IoT device 1.

The protocol details may relate to protocols a device 10, 12 is required to use in order to communicate/connect with the IoT device 1 (e.g. for negotiation, security, communication etc.). The protocol details may be provisioned on the IoT device 1, e.g. on manufacture or post-deployment e.g. by a user or engineer.

The status details may provide details relating to the availability of the IoT device to communicate with other devices, or the availability of the IoT device's functionalities, for example: Status=Online or Offline.

On receiving the communication 15, the devices 10, 12 may initiate a connection with the IoT device. For example, one or more of the devices 10, 12 may transmit a request to connect to the IoT device 1.

In examples, the request to connect defines one or more operations which the genuine device requests the IoT device to perform as part of establishing a connection therewith (e.g. communicate/bond/pair/perform a specified function or operation).

For example, the IoT device may establish a connection whereby the IoT device 1 and devices 10, 12 undertake a negotiation protocol with each other (e.g. TLS, RSA, SSL handshake or Diffie-Hellman key exchange) before exchanging communications.

Additionally, or alternatively, the IoT device 1 may establish a connection by performing a function (e.g. a one-time function) as requested by the device 10, 12 (e.g. turn GPS on or off; open an associated door; dispense a beverage; send a signal to a particular server).

It will be appreciated that processing of such requests to connect by the IoT device 1 requires different resources including: processor power, memory, access to communications channel(s) and/or power from the power source.

In FIG. 2, devices 10 are depicted as being uncompromised by an attacker/malware hereinafter "genuine devices", whereby the genuine devices may transmit requests to connect to the IoT device 1 in order to access the functionalities/capabilities advertised in the broadcast communication 15 and/or to engage in communication with the IoT device 1.

Device 12 is depicted as being a non-genuine device, hereinafter "rogue device", whereby rogue devices may be configured to communicate with the IoT device 1 solely to overload/exploit/drain one or more of its resources. Such rogue devices may initially have been genuine devices which became compromised by a third party/malware, or may be bespoke rogue devices placed in communication with the IoT device 1 to carry out an attack.

In an illustrative example, the rogue device 12 may effect a power-DoS attack by submitting repeated requests to connect with the IoT device 1, such that processing of the repeated requests by the IoT device 1 results in depletion of its battery to the extent that the IoT device 1 shuts down. A power-DoS attack may be performed over a period of time until the battery is depleted, e.g. over a period of minutes, hours, days, weeks, months etc.

FIG. 3a schematically shows example communications between IoT device 1 and genuine device 10, and FIG. 3b schematically shows example communications between the IoT device 1 and rogue device 12, whereby the rogue device 12 is configured to effect a DoS attack on the IoT device 1. Like reference numerals used previously will be used as appropriate.

In FIG. 3a, the IoT device 1 transmits a communication 15 which may comprise one or more details relating to the IoT device 1 as previously described.

The communication 15 may be a unicast or a broadcast communication, whereby, for example, the IoT device 1 may be configured to generate a broadcast communication 15 periodically (e.g. every millisecond, sec, minute etc.) or the communication 15 may be generated in response to a scanning communication 14 generated by the genuine device 10. In the following illustrative examples, the communication 15 is described as a broadcast communication.

The scanning communication 14 is an optional communication, and is not required in order for the IoT device 1 to generate the broadcast communication 15.

The optional scanning communication 14 is depicted as a dashed line, and may, for example, be a broadcast communication requesting a response from all IoT devices in transmission range thereof e.g. requesting information on the functionalities/capabilities of such devices; or whereby the broadcast communication 14 requests responses from a specific class of devices (e.g. by including a Class identifier), or by devices made by a particular manufacturer (e.g. by including a Manufacturer identifier). Alternatively, the scanning communication may be a unicast communication.

On receiving the broadcast communication 15, the genuine device 10 may present details of the broadcast communication 15 to a user of the genuine device 10 to request user authorisation as to whether the genuine device 10 should proceed to connect to the IoT device 1 e.g. via a button/touchscreen input on the genuine device 10. Alternatively, the genuine device 10 may automatically request to connect with the IoT device 1. In either case, the genuine device 10 may transmit a response 20 comprising a request to connect to the IoT device 1.

The IoT device 1 processes 25 the request to connect and, in the present example, establishes a connection with the genuine device 10. As above, establishing a connection may include initiating a negotiation protocol with the genuine device 10, whereby, for example, connection data 30 is transmitted to the genuine device 10 from the IoT device 1.

Connection data 40 may then be transmitted to the IoT device 1 from the genuine device 10.

The connection data 30, 40 may be data required by both devices 1, 10 to complete the negotiation protocol such as synchronisation data which may include timing data relating to clock circuitry on the IoT device or genuine device; channel data such as the channel frequency to be used during the negotiation protocol, requested data (e.g. certificates) and/or authorisation data (e.g. pin numbers, cryptographic keys, certificates, software tokens, shared secret, passwords etc.).

When the negotiation protocol is complete, the IoT device 1 and genuine device 10 are considered to be connected and, for example, may undertake secure communications 50 with each other. The secure communications 50 may include the genuine device 10 providing authorisation data to the IoT device 1 in order to access one or more features of the IoT device 1.

The secure communications 50 may continue until termination of the connection 55 between the devices 1, 10. The connection may be terminated by the IoT device 1, for example on expiration of the device's 10 authorisation or after the IoT device 1 performing an authorised function during the secure communications 50 (e.g. a one-time authorised function). Alternatively, the connection may be terminated by the genuine device 10, for example, by moving out of communication range of the IoT device 1.

Additionally, or alternatively, the IoT device 1 may perform a function as requested by the device 10, 12, as part of the request to connect, without engaging in a negotiation protocol.

Having connected once, the IoT device 1 and genuine device 10 may be considered to have a relationship, and the genuine device 10 may engage in secure communications with the IoT device 1 using the previously exchanged connection data.

As an illustrative example of such devices, the IoT device 1 may be a locker in a train station, whereby the broadcast communication may comprise details of the locker e.g. 'ID=Locker No. 23; Status=available'. A user desiring to access the locker may download a software token having a specified validity onto a device 10 associated therewith, such as a mobile phone. The user may then pair the mobile phone with the locker, such that the locker allows access to the user until the software token expires.

In an alternative example, the IoT device may be a vending machine in a public area, whereby the broadcast communication may comprise details of the vending machine e.g. 'ID=Garage1719; Product=Espresso; Product=Latte; Product=Americano; Status=All Available'. A user wishing to use the vending machine may download a software token for a specific product onto a device associated therewith such as a smartwatch. The user may then pair the smartwatch with the vending machine, such that the vending machine dispenses the product authorised by the software token.

It will be appreciated that the illustrative examples described above are non-limiting examples and the IoT device may take any suitable form and provide any suitable functionality.

It will further be appreciated that the IoT device 1 may receive requests to connect from other devices that receive the communication. As above, whilst genuine devices may request to connect to access the capabilities/functionalities of the IoT device, rogue devices may attempt to intentionally overload/exploit/drain the IoT device's resources, thereby denying access to the IoT device by genuine devices as part of a DoS attack.

As an illustrative example, the IoT device 1 of FIG. 3b transmits a communication 15 which is received by a rogue device 12. As before, the communication 15 may, in some examples, be a broadcast communication, and may be generated in response to a scanning communication 14 received from the rogue device 12.

On receiving the communication 15, the rogue device 12, transmits a response 20 comprising a request to connect to the IoT device 1.

The IoT device 1 processes 25 the request to connect, and, for example, transmits connection data 30 to the rogue device 12 e.g. as part of a negotiation protocol.

In contrast to the example genuine device of FIG. 3a, the rogue device 12 may terminate the connection 55 with the IoT device 1 after receiving the connection data but before connecting with the IoT device 1, and may transmit a further response 20 comprising a further request to connect, which is also processed 25 by the IoT device 1 and connection data 30 returned. The rogue device 12 may send repeated responses 20 comprising requests to connect to the IoT device 1 as part of a power-DoS attack, whereby the requests are processed 25 at the IoT device 1, thereby increasing the demand for resources at the IoT device 1, which may result in the power source of the IoT device being drained to the extent that the IoT device 1 is reset/switched off/powered down 70.

Alternatively, in another type of DoS attack, a communications channel(s) may be blocked by the repeated responses from the rogue device 12 or sending the connection data 30 to the rogue device 12, thereby preventing access to the IoT device 1 by other devices in a DoS attack.

To mitigate such DoS attacks (e.g. mitigate the risk, likelihood, number of, severity and/or effects thereof), the IoT device 1 may generate a Proof of Work task, hereinafter "task", thereon, and transmit the task to one or more devices (e.g. genuine or rogue devices) in communication range thereof.

Alternatively, such tasks may be generated by a trusted resource (e.g. a server) and provisioned on the IoT device, for example at manufacture or whereby the solution may also be generated by the trusted device and transmitted to the IoT device, such that the IoT device is used as a proxy device for the server.

FIG. 4a schematically shows example communications between IoT device 1 and a plurality of genuine devices 10a-10n, and FIG. 4b schematically shows example communications between the IoT device 1 and rogue device 12. Like reference numerals used previously will be used as appropriate.

In FIG. 4a, the IoT device 1 generates a communication 115 depicted as a broadcast communication, which may comprise details relating to the IoT device 1 as previously described. In the present example, the communication 115 also includes a task.

As before, the communication 115 may be generated in response to a scanning communication 14 received from one or more genuine devices 10a-10n On receiving the communication 115, the genuine devices 10a-10n may or may not automatically solve 105 the task. In some examples, the genuine devices 10a-10n may present details of the communication 115 to a user of the genuine device 10a-10n to request user authorisation to solve 105 the task and/or to connect to the IoT device 1. In some examples, solving the task may require user input (e.g. as part of a challenge-response test via a touchscreen on the connecting device).

The user may decline to solve the task or may not authorise the genuine device 10a-10n to connect to the IoT device or to solve the task.

In the illustrative example of FIG. 4a, genuine device 10a is depicted as solving the task, whereby the genuine device 10a responds to the communication 115 by transmitting a response 120 comprising a request to connect and the solution to the task, to the IoT device 1. It will be appreciated that the request to connect and solution to the task may be provided within the same or in different messages as part of the response 120. In some examples, the solution to the task may be taken as a request to connect.

After receiving the response 120, the IoT device 1 processes 125 the request to connect and verifies that the task was solved correctly. If the task was solved correctly, the IoT device 1 may establish a connection with the genuine device 10a.

For example, the IoT device 1 may initiate a negotiation protocol with the genuine device 10a, whereby connection data 30, 40 may be exchanged between the IoT device 1 and genuine device 10a to complete the connection. After connection, secure communications 50 may continue until termination of the connection 55 by the devices 1 or 10a. In alternative examples, establishing a connection with the IoT device 1 may involve the IoT device performing a function (e.g. a one-time function) as requested by the genuine device 10a without engaging in a negotiation protocol.

The IoT device 1 may not set a task in every communication 115, and may only set a task if configured to do so based on one or more attributes relating to: the IoT device, the devices seeking to connect thereto or communications received from such devices as monitored at the IoT device 1.

Such attributes of the IoT device may include, for example: the availability/status of IoT device; the number of/frequency of scanning communications received by the IoT device; the number of/frequency of requests to connect received by the IoT device; the number of devices in communication range etc.

For example, if the number of requests to connect from different devices received by the IoT device 1 exceeds a threshold number (e.g.>1000 requests received) or exceeds a request frequency threshold (e.g.>20 requests/minute), then the IoT device 1 may set a task.

Additionally or alternatively, the IoT device 1 may set a task if the capacity/performance of one of its resources is determined to be below a threshold level (e.g. Battery<50% of capacity; NV memory<20% remaining).

Additionally or alternatively the task may be adjusted such that the type of task and/or the complexity thereof may vary, whereby the particular task and/or the complexity thereof is based on the one or more of the attributes as determined at the IoT device 1.

Alternatively, the IoT device 1 may receive input from a trusted device in communication therewith such as a server (not shown), which determines if a task should be set and/or what task should be set.

As illustratively shown in FIG. 4a, after termination of the connection 55, the IoT device 1 transmits a communication with a task 115 and receives multiple requests to connect 60 from a plurality of devices 10a-10n. In light of the number of requests to connect from different devices 60, the IoT device 1 may set a new task, whereby the complexity of the new task may be increased in comparison to the task in communication 115, and whereby the new task is included in communication 116.

On receiving the communication 116, the genuine devices 10b-10n may solve 105 the new task and request to connect with the IoT device 1 automatically. Alternatively, the genuine devices may not solve the task (e.g. based on user input, or not having the required resources to solve the task).

For example, as shown in FIG. 4a, only genuine device 10b is depicted as solving the new task and transmitting a response 120.

Therefore, it will be appreciated that by setting a new task, e.g. by increasing the complexity of the task, certain devices of those receiving the communication 115,116 may not respond. Such functionality reduces the load on the IoT device's resources.

In examples, the device 10a, having previously established a connection with IoT device 1 by solving a task, may not be required to solve a further task in order to establish further connections. In such examples, the IoT device 1 may retain an identifier associated with the device 10a, or the solution to the task may comprise a software token for establishing one or more connections with the IoT device 1.

However, in alternative examples, device 10*a* is required to solve a task in order to re-establish a connection with the IoT device 1. As an illustrative example, the solution to the task may comprise a software token for establishing the connection with the IoT device 1, whereby on establishing the connection, that particular token is marked as invalid or is discarded by the IoT device 1. New connection requests may be ignored if the particular token is known or has been used before.

In the illustrative example of FIG. 4*b*, the IoT device 1 transmits a communication 115 comprising a task which is received by rogue device 12.

On receiving the communication 115, the rogue device 12 determines whether or not to solve the task, based on, for example: user input, capability to solve the task, resource capacity/availability and/or a determination of the efficiency of solving the task vs efficiency of continuing with a DoS attack.

In the present example, the rogue device 12 solves 105 the task in the communication 115 and responds 120 by transmitting a request to connect and the solution to the task to the IoT device 1.

As before, on receiving the response 120, the IoT device 1 processes 125 the request to connect and verifies that the task was solved correctly, and if the task was solved correctly, the IoT device 1 may initiate a negotiation protocol with the rogue device 12 by transmitting connection data 30 to the rogue device 12. In the present example, the rogue device 12 terminates the connection 55 without engaging in the negotiation protocol with IoT device 1. Additionally, or alternatively, the IoT device 1 may perform a function as requested by the rogue device 12.

The rogue device 12 may then respond 120 to further communications 115 comprising tasks of similar complexity, and repeatedly connect and terminate connections 55 to overload/exploit/drain the resources of the IoT device 1 as a DoS attack.

However, as above, the IoT device 1 may adjust the task by changing the type of task and/or increasing the complexity of the task based on one or more attributes of the IoT device and/or the connecting device, and transmit a communication 116 having an adjusted task. It will be appreciated that any of the communications 115, 116 may be generated in response to a scanning communication 14 generated by one or more the rogue devices.

In the present illustrative example, on receiving the communication 116 comprising the adjusted task, the rogue device 12 does not solve the adjusted task e.g. because it may be too power or processing intensive, and instead the rogue device 12 transmits a response 121 without a solution to the adjusted task or with a guessed solution requiring reduced computational overhead.

As such, the IoT device 1 processes 125 the response 121 and verifies whether the task was solved correctly. In the present example, the task was not solved correctly and therefore, based on the unsuccessful verification, the IoT device 1 does not engage in a negotiation protocol to connect with the rogue device 12 nor does the IoT device perform a requested function. The rogue device 12 is illustratively shown to terminate 117 communicating with the IoT device after a period of time, thereby increasing the availability of the IoT device's 1 resources for access by genuine devices capable of solving a task set by the IoT device and which dedicate sufficient resources to solving the task.

As set out in the schematic examples of FIGS. 4*a* & 4*b*, a device sending requests to connect to the IoT device may be required to solve a task (e.g. using calculation, computation, logic etc.) and demonstrate the solution to the IoT device 1. If a request to connect is received from a device that does not demonstrate a solution to the task, then, after an unsuccessful verification, the IoT device 1 may ignore/disregard requests to connect from that particular device. Incorrect or invalid solutions received at the IoT device may be discarded (e.g. silently or with an error code). Such functionality prevents the task being discarded when a rogue device 12 spams the IoT device 1 with spoofed answers pretending to be from a genuine user that is currently solving the task.

Such functionality means that devices which have a genuine motivation to connect to the IoT device 1 are required to allocate resources thereon (processing circuitry, memory circuitry) to solve the task, and provide a solution to the task along with the request to connect to the IoT device 1.

However, a rogue device (e.g. configured to undertake a DoS attack) may not have the necessary resources required to solve the task or, if capable, the rogue device may not allocate the necessary resources required to solve the task, as allocating the resources to solve the task may be determined to be less beneficial than undertaking/continuing with a DoS attack.

The IoT device 1 can verify whether a device requesting to connect thereto has expended computational effort in solving a task with reduced processing required in comparison to processing a request to connect or engaging in a negotiation protocol, and may ignore devices that do not expend such computational effort. Therefore, the amount of requests to connect received by IoT devices which set tasks may be reduced in comparison to IoT devices which do not set tasks.

Furthermore, the IoT device may not have any previous relationship with the devices requesting to connect. Therefore, it's possible to establish connections with remote devices having a genuine motivation to connect without first storing/being provisioned with corresponding cryptographic keys, which may otherwise require memory space on the IoT device.

Furthermore, the IoT device may set a task and increase the complexity of the task based on one or more attributes as previously described.

An example of a task is illustratively shown at FIG. 5*a*, whereby the IoT device 1 generates a random number, depicted as an n-bit nonce $(X_n)$ 100 (e.g. 2-to 512-bit nonce), and transforms 104 the nonce $(X_n)$ 100 to provide a transformed value, depicted as a hash $(\#_x)$ 102. Such a transformation may be undertaken using a suitable function, such as a hash function (e.g. SHA-224, SHA-256, SHA-512 etc.).

The IoT device 1 may then include the hash (# x) 102 and details of the hash function 104 as a task 106, which is transmitted as part of communication 115 to a device 10 attempting to connect thereto, hereinafter "connecting device".

The communication 115 may also include device details 108, which, as above, may include identification details, capability/functionality details and/or status details of the IoT device 1. The communication 115 may also include protocols/instructions as to how to solve the task 106 (e.g. a task description). Furthermore, the communication 112 may optionally include a timestamp 112, to define a validity period for the communication and/or the task 106.

The connecting device 10 receiving the communication 115 attempts to solve the task based on the protocols/ instructions as to how to solve the task received in the communication 115, or which may be pre-provisioned thereon.

For the present example, the task is to identify the number which, when transformed using the specified hash function, provides (# x).

Therefore, the connecting device 10 generates one or more different n-bit nonces 109 ($Y_n$), and transforms the different nonces 109 using the hash function 104 detailed in the task 106, until a transformed value (# y) 110 corresponding to the transformed value (# x) 102 is generated, thereby solving the task.

The device 10, 12 may then generate a response 120 comprising a request to connect 114 and the proposed solution 110 (the n-bit nonce which provided (# y)==(# x)), and transmit the response 120 to the IoT device 1 for verification of the proposed solution.

The IoT device 1 may then verify that the connecting device has solved the task by checking the proposed solution is correct e.g. by transforming the solution using the specified hash function to check that it provides # x.

Therefore, the IoT device 1 can check that the proposed solution is correct by undertaking a single hash function, whereas the connecting device 10 may have to undertake more complex calculations to generate the solution.

It will be appreciated that the task 106 may, optionally, only be valid for a specified period of time as defined by timestamp 112, whereby solutions received after expiry of the specified period may considered to be void and ignored. Therefore, the solutions may be considered to be time-bound.

The task may be adjusted whereby, the complexity of the task is increased by, for example, increasing the length of the nonce ($X_n$) (e.g. from 2-bits to 4-bits to 8-bits etc.), increasing the number of function rounds required to be undertaken to generate the hash (# x) (e.g. from SHA256 to SHA512), providing multiple transformed values, and/or decreasing the period of time for which the task 106 is valid.

The complexity of the task may be decreased by, for example, providing the leading bits of the nonce, decreasing the length of the nonce, decreasing the number of function rounds required to generate the solution, and/or increasing the period of time for which the task 106 is valid.

A further example of a type of task is illustratively shown at FIG. 5b, whereby like reference numerals used previously will be used as appropriate.

In FIG. 5b, the IoT device 1 generates an n-bit nonce ($X_n$) 100 (e.g. a 2- to 512-bit nonce). As before the nonce ($X_n$) 100 is transformed to provide hash (# x) 102 using a suitable hash function 104.

In the present example, one or more bits of the nonce ($X_n$) 100 are modified to provide a modified nonce 113 (# x), whereby in FIG. 5b, the unmodified bits of the nonce are denoted as portion (A) whilst the modified bits, having a specific pattern of bits are denoted as portion (B). In the present example, all bits of the modified portion (B) are set to 0 (zero). However, in alternative examples all bits of the modified portion (B) may be set to 1 or to any other specific pattern of 0's and 1's.

The IoT device 1 may then include the modified nonce 113 and the hash function 104 as task 106, which is transmitted to the connecting device 10 as part of communication 115. The communication 115 may also include device details 108 and timestamp 112, and instructions as to how to solve the task 106.

In order to solve the task 106 described in FIG. 5b, the connecting device 10 receiving the communication 115 generates one or more different patterns of bits for the modified portion B to provide one or more nonces ($Y_n$) 109, and transforms the one or more nonces ($Y_n$) 109 using the hash function 104 specified in the task 106 until a transformed value (# y) 110 corresponding to the transformed value (# x) 102 is generated, thereby identifying the specific pattern of bits corresponding to portion (B) of nonce 100 and solving the task.

The connecting device 10 may then generate a response 120 comprising a request to connect 114 and the solution 118 (e.g. the pattern of bits corresponding to portion (B) of the nonce), and transmit the response 120 to the IoT device 1 for verification of the proposed solution.

The IoT device 1 may then verify that the connecting device has solved the task by checking the proposed solution is correct e.g. by checking the pattern of bits corresponding to portion (B) of the nonce provides # x.

The complexity of the task may be increased by, for example, increasing the length of the modified portion (B) (e.g. from 2-bits to 4-bits to 8 bits etc.), increasing the number of function rounds required to be undertaken to generate the hash (# x) (e.g. from SHA256 to SHA512), and/or decreasing the period of time for which the task 106 is valid.

The complexity of the task may be decreased by, for example, decreasing the length of the modified portion (B) (e.g. from 32-bits to 16-bits to 8-bits etc.), decreasing the number of function rounds required to generate the hash (# x), and/or increasing the period of time for which the task 106 is valid.

In some cases, the connecting device 10 may not send the solution 110, 118 as part of a response 120, but instead, the connecting device 10 may use the solution (or transformed solution) as part of any negotiation protocol undertaken with the IoT device 1, whereby the IoT device may initiate the negotiation protocol on receiving a request to connect, and whereby the solution is used as part of the negotiation protocol e.g. as a password, shared secret or PIN number recognised by the IoT device 1.

The connecting device may derive synchronisation data from the solution 110, 118, so that the response 120 can be transmitted therefrom and received by the IoT device 1, for example, at a correct time and/or using a correct communications channel.

In an illustrative example, synchronisation data in the form of timing data may be derived from the solution, whereby the timing data is used to synchronise timing circuitry on the connecting device with timing circuitry on the IoT device 1 in order to send the response 120 at the correct time (i.e. when the IoT device is 'listening for a response'). Additionally, or alternatively, the devices may derive synchronisation data in the form of channel data from the solution, whereby the channel data is used to identify the correct frequency channel on which to send the response.

As such, a rogue device merely flooding the system with requests to connect to the IoT device as part of a DoS attack will be capable of deriving the synchronisation data, and so the likelihood of an IoT device receiving requests to connect from the rogue devices may be reduced. The IoT device 1 may provide instructions for deriving the synchronisation data as part of the communication 115, or as part of a separate communication.

The device may also include the solution (or transformed solution) as part of the response to demonstrate that it solved the task, and thereby reduce the likelihood that the device sending the response did so by chance. When transmitting the transformed solution, a party intercepting the transformed solution will not be able to derive the synchronisation data from the transformed solution.

As above, the task is not limited to being included in the communication 115, but may be sent as part of a separate communication before or after receiving a request to connect from a device, but preferably before engaging in a negotiation protocol with such a device. It will be appreciated that including the task in the communication 115 reduces the number of communications required to be exchanged between devices before connecting.

Whilst only one connecting device is depicted in FIGS. 5a and 5b, it will be appreciated that any number of devices may attempt to connect with the IoT device by first solving a task.

It may be advantageous for the IoT device 1, on receiving a response having a solution to a task, to trust that the task was solved by the connecting device which sent the response and not solved by a different device which may be using the connecting device as a proxy device.

A further example of a type of task is illustratively shown at FIG. 5c, whereby like reference numerals used previously will be used as appropriate. In FIG. 5c the task generated by the IoT device 1 includes an identifier associated with the connecting device such that only the device which solved the task may connect with the IoT device 1.

In the present example, both the IoT device 1 and the connecting device 10 each comprise a private secret (e.g. one or more numbers (random or otherwise)) and a shared secret (e.g. one or more numbers (random or otherwise)) which can be shared with/derived by other devices e.g. using a defined protocol.

Taking a Diffie-Hellman Key Exchange protocol as an illustrative example, the IoT device 1 and connecting device 10 may agree on two prime numbers 'g' and 'p' (e.g. as part of a pairing operation), where p is typically >256 bits and g is a primitive root modulo p. (p may be chosen such that (p−1)/2 is a prime number.) The numbers g and p may be exchanged between the devices 1 & 10 as shared secrets.

The IoT device 1 uses a random number 'a' as its private secret, and the connecting device 10 uses a number 'b' as its private secret, whereby, typically, a & b>256 bits)

The IoT device 1 then computes, 'A' 122, where A=g^a (mod p), whilst the connecting device 10 computes 'B' 123, where B=g^b (mod p). 'B' is transmitted from the connecting device 10 to the IoT device 1, whereby B is taken to be a device identifier for the connecting device 10.

The IoT device 1 then generates a task input 124, which, in the present example, comprises a transformation of a concatenation of data inputs. In the present example, the transformation comprises a hash function (e.g. SHA-256, SHA-512).

In the present example, the data inputs include A, B, S and Z, where 'Z' comprises an n-bit number (where n≥1), and where S is a task sequence number incremented/changed for every new task generated by the IoT device. Including the sequence number S as a data input is optional.

In some examples, the IoT device may track the solution to the task for every sequence number created thereby, or for a set amount of sequence numbers (e.g. previous 10 sequence numbers).

In the present example the task 106 comprises "#[A∥B∥S∥Z]=specific pattern of n-bits; solve for Z".

The IoT device 1 may then transmit the task 106 to the connecting device 10 as part of a communication 115. The communication 115 may also include other data to enable the connecting device 10 to solve for Z e.g. sequence number (S) (when included in the task 106).

The communication 115 may also include device details 108, which, as above, may include identification details, capability/functionality details and/or status details of the IoT device 1. The communication 115 may also include protocols/instructions as to how to solve the task 106. Furthermore, the communication 112 may optionally include a timestamp 112, to define a validity period for the communication and/or the task 106.

On receiving the communication 115, the connecting device 10 will attempt to solve for Z, by generating different n-bit numbers 119, and using those numbers as a data input to a transformation of a concatenation of specified data inputs (e.g. A, B, S) in the communication 115 until the required pattern of n-bits is achieved.

When the connecting device achieves the specified pattern, the connecting device 10 transmits the proposed solution 126 identified thereby (i.e. $Z_{CD}$) to the IoT device 1. In some examples the connecting device 10 may sign $Z_{CD}$ using B, or include B in the communication to provide evidence of its identity. The connecting device 10 may also transmit other data such as the sequence number S to the IoT device 1, as originally included in the communication 115.

The IoT device 1 may then verify that the connecting device has solved the task by performing #[A∥B∥S∥$Z_{CD}$] and checking the proposed solution is correct e.g. that the result=specific pattern of n-bits. Therefore, the IoT device 1 can verify that $Z_{CD}$ is correct using a single calculation, whereas the connecting device 10 may have to undertake more complex calculations to solve for Z.

If the solution is correct, then the IoT device 1 may continue in a key exchange protocol with the connecting device 10.

For example, the IoT device 1 may continue with the Diffie-Hellman key exchange with the connecting device 10 based on A and B, whereby the IoT device 1 computes a shared key K using, for example:

$$K=B\hat{\ }a(\bmod p)=(g\hat{\ }b)\hat{\ }a(\bmod p).$$

The connecting device 10 also computes the shared key K using, for example:

$$K=A\hat{\ }b(\bmod p)=(g\hat{\ }a)\hat{\ }b(\bmod p).$$

The IoT device 1 and the connecting device 10 can then use the shared keys K to exchange information in a cryptographically secure manner with a reduced risk of other devices obtaining such information because, as will be appreciated, it would be computationally expensive for a rogue device to calculate K.

It will be appreciated that in the embodiments described in FIGS. 5a and 5b, the IoT device 1 may set global challenges whereby a plurality of devices 10/12 may solve the same task by identifying a common solution.

In the embodiment described in FIG. 5c, the IoT device 1 may set local challenges, whereby the task is seeded with an identifier of the connecting device 10, and, therefore, the solution to particular task will be unique to the device whose identifier seeds the task. Should a rogue device attempt to solve the task, that rogue device would not be able to create the identifier, and so would not be able to solve the task. Therefore, the rogue device would also not be capable of generating the shared keys used in the secure communications.

In other examples, key exchange protocols other than the Diffie-Hellman key exchange may be used.

In some examples, the IoT device 1 may only provide the connecting device 10 with a limited opportunity to continue in the key exchange protocol (e.g. a set time period, number of connection attempts), failing which, the IoT device would set a new task for the connecting device.

Furthermore, in some examples, the connecting device 10 may transform the proposed solution 110, 118, 126 before transmitting it to the IoT device. Such a transformation may be performed using the same or a different transformation used in generating the solution to the task. It will be appreciated that the transformed solution may be compressed in size in comparison to the non-transformed solution. Therefore, on receiving the response, the IoT device 1 can verify that the task was solved by checking the transformed value. Such functionality may reduce processing power at the IoT device 1 required to verify the solution.

Whilst verification of the solution is described above as being undertaken on the IoT device 1, in some examples, the IoT device 1 may send the received solution to a trusted device for verification at the trusted device, thereby reducing the processing burden on the IoT device. The trusted device may then send a signal to the IoT device to confirm whether or not the solution is correct.

Furthermore, incorrect or invalid solutions received at the IoT device may be discarded (e.g. silently or with an error code). Such functionality prevents the task being discarded when a rogue device spams the IoT device with spoofed answers pretending to be from a genuine user that is currently solving the task.

The examples of the types of tasks described in FIGS. 5a to 5c above require a device to perform one or more transformation functions (e.g. hash functions) to solve a task.

However, the hardware of rogue devices may be modified to improve the efficiency of solving such tasks and so, some rogue devices may solve all tasks and adjusted tasks with little effort. For example, rogue devices may be provided with graphics-card processor units (GPUs), field-programmable gate arrays (FPGAs), and/or application specific integrated circuits (ASICs), or in some cases the rogue device may be provided with a network connection dedicated to solving such tasks. As such, the tasks are not limited to solving hash functions, and different types of tasks which minimise the performance gap between solving tasks using CPUs and solving using specialized optimizations using graphics processors (GPUs) or custom circuits. Such tasks may include solving cuckoo cycles.

As will be appreciated by a person skilled in the art, cuckoo cycles may be used as a proof-of-work scheme that combines scalable memory requirements with relatively simple verification, where memory latency dominates the runtime. Solving cuckoo cycles provides a memory-bound proof-of-work scheme.

In alternative examples, and, as above, solving the task may require user input (e.g. as part of a challenge-response test via a touchscreen on the connecting device).

As an illustrative example, the IoT device 1 may transmit a 'CAPTCHA' (completely automated public Turing test to tell computers and humans apart) to the connecting device as a task to be solved, whereby the solution to the CAPTCHA may be sent back to the IoT device 1 for verification.

Additionally, or alternatively, the solution to the CAPTCHA may be used as one of the seeds/ingredients in the task to be solved.

Additionally, or alternatively, the solution to the CAPTCHA may be combined with a connecting device identifier (e.g. public key, mac address, device ID etc.) using a cryptographic hash, which is used as a device identifier as previously described (e.g. see FIG. 5c).

Whilst a challenge-response test requires a user to be available to solve the CAPTCHA, the IoT device 1 does not require a screen, as the CAPTCHA may be transmitted as a binary image to the connecting device.

In some embodiments, and as above, the response comprising the solution may be time-bound, whereby an IoT device 1 may not wait an infinite amount of time for a correct solution from a device, as a this may be a DoS attack because other devices may not have the opportunity to connect whilst the IoT device is awaiting a correct solution from the connecting device.

As an example, FIG. 6 schematically shows a plurality of connecting devices 10a-10z attempting to connect to an IoT device 1, whereby the IoT device 1 is configured to set a task having a specified complexity level, with a time limit of 60 seconds for providing a solution. Like reference numerals used previously will be used as appropriate.

Table 1 of FIG. 6 shows that not all of the connecting devices 10a-10z are capable of providing a solution within the specified time limit, whereby devices 10c, 10j and 10k solve the task after the specified time limit, and therefore, will not connect with the IoT device 1.

Therefore, any devices which are not capable of identifying a correct solution within the specified time limit are at a disadvantage, in that such devices will never be capable of providing a correct solution to the IoT device 1, and therefore, never be capable of connecting to the IoT device 1. This may be frustrating for an owner of such a device, in that the owner would not be capable of interacting with the IoT device 1, and would not be capable of taking advantage of the functionalities offered by the IoT device 1.

In embodiments, the IoT device 1 is configured to accommodate devices which are capable of solving set tasks within a specified time period, and devices which are not capable of solving set tasks within the specified time period, hereinafter "NC-devices".

In some embodiments, an NC-device may demonstrate that it has attempted to complete a number of tasks thereby establishing a level of trust (T) with the IoT device 1, after which the IoT device may establish a connection with the NC-device, notwithstanding that the NC-device did not complete a single task.

Additionally, or alternatively, the NC-device may demonstrate that it completed a certain percentage of a task (e.g. 60%), such that the IoT device reduces the complexity of a subsequent task for that particular NC-device. The NC-device may continue to repeatedly demonstrate that it has attempted to compete tasks, and to receive tasks having decreasing complexity until it receives a task having a complexity level which it can fully complete.

As an example, FIG. 7a schematically shows an IoT 1 device in communication with NC-device 150. Like reference numerals used previously will be used as appropriate.

As above, the IoT device 1 may transmit a communication 115 comprising a task having a specified complexity to the NC-device 150. In the present example, the NC-device 150 is not capable of solving the task (e.g. task is too difficult, or specified time limit is too short).

However, the NC-device 150 may attempt the task and generate a partially completed solution. As an example, where the task requires a set pattern of n-bits to be provided, the NC-device 150 may generate a partial solution by providing a pattern of (m) bits (where m<n).

The NC-device 150 may then transmit the partial solution 152 to the IoT device 1 along with an identifier associated with the NC-device 150, depicted as 'Dev2' in FIG. 7a.

In the present example, the IoT device 1 maintains a state of NC-devices from which it receives partial solutions.

In the present example, the partial solutions are used as the trust credential, and in some examples the device identifier of the connecting device may also be provided as or as part of the trust credential.

A trust threshold associated with a particular NC-device is reached based on or in response to receiving one or more trust credentials from the NC-device, such that the NC-device is permitted to connect to the IoT device 1, notwithstanding that it did not solve the task. It will be seen, therefore, that the trust threshold is an attribute of the NC-device.

In the example shown in FIG. 7a, a trust table 154 records the number of partial solutions received ($PS_{No.}$) from all NC devices, which may be identified by the device identifiers (ID). Therefore, the trust table 154 may be used as a counter, whereby on reaching a trust threshold of partial solutions (e.g. 4) the NC-device is permitted to connect.

In examples, the trust threshold may be determined by a suitable algorithm e.g. as provisioned on the IoT device e.g. as part of the protocol level. The algorithm may also be provisioned on the NC-devices e.g. as part of the protocols/instructions as to how to solve the task in the communication 115.

In examples, the initial complexity of a task for a particular device may be specified based on attributes of the particular device e.g. based on previous attempts the device made to solve previous tasks.

FIG. 7b schematically shows IoT 1 device in communication with NC-device 150, but whereby the NC-device 150 maintains a state of the number of tasks it has attempted to solve. Like reference numerals used previously will be used as appropriate.

In the present example, the NC-device 150 comprises a table 160, hereinafter 'solution table,' capturing the results of partial solutions (PS) for a particular task as identified by task sequence number (S).

When the NC-device 150 has completed a specified number of partial solutions, the solution table 160 may be transmitted 162 to the IoT device 1 as a trust credential to demonstrate trust. A device identifier of the NC-device may also be transmitted along with the solution table 160.

As above, the IoT device 1 may permit the NC-device 1 to connect on the basis of the solution table 160 e.g. after a successful verification that the number of partial solutions captured therein are sufficient to reach a trust threshold e.g. as determined by a suitable algorithm.

In alternative embodiments, instead of merely allowing NC-device 150 connect once a certain trust threshold is reached, the complexity of the tasks transmitted to a particular NC-device may be reduced until the NC-device is capable of solving the task and presenting a complete solution. The point at which the IoT device 1 reduces the complexity of the task may be following a successful verification that a trust threshold is reached.

Alternatively, the validity period set to solve a task may be extended. For example, where devices are incapable of solving tasks having a reduced complexity within a set validity period, the validity period may be extended such that the IoT device will accept solutions within the extended validity period.

In examples, the IoT device 1 may use the device identifiers to blacklist particular connecting devices e.g. based on an analysis of the behaviour of devices. For example, if a particular connecting device routinely transmits partial solutions but never connects to the IoT device 1 when permitted, then the IoT device 1 may disregard trust credentials from that device going forward, or may raise the trust threshold for that particular connecting device.

Furthermore, the IoT device may also communicate with other IoT devices in a network, directly or indirectly (e.g. via a server), in order to distribute information relating to a particular rogue device. For example, the IoT device may transmit information to the other IoT devices that a particular rogue device has attempted to perform a DoS attack thereon, such that complexity of tasks from all IoT devices may be increased whilst the rogue device is active in the network (e.g. attempting to connect to devices), thereby mitigating a DoS attack (e.g. mitigate the risk, likelihood, number of, severity and/or effects thereof), such as a power-DoS attack, by the rogue device on one or more of the IoT devices.

FIG. 8 schematically shows an example method 300 of an IoT device connecting with a remote device e.g. a genuine device/rogue device whilst mitigating DoS attacks (e.g. mitigate the risk, likelihood, number of, severity and/or effects thereof), such as a power-DoS attack.

Method 300 begins at Start 302. At Step 304 the IoT device generates a communication comprising a task to be solved and transmits the task to the remote device. The communication may be transmitted in response to a communication received from the remote device, such as a scanning communication. The communication from the IoT device, may be a broadcast communication and may comprise details about the IoT device (e.g. capabilities/functionalities). Furthermore, the specific type of task and/or complexity of the task may be set by the IoT device before transmission.

At Step 306, the IoT device awaits a response comprising a proposed solution or a trust credential from the remote device.

At Step 307, if no response is received, or following an unsuccessful verification of the response (e.g. an incorrect response is received or if a trust threshold is not reached), the IoT device may generate a new communication comprising an updated task, whereby the task is adjusted e.g. the complexity thereof may be modified or the type of task modified. Adjusting the task is beneficial in that all remote devices in communication range of the IoT device may not have the resources to solve all types of tasks, and/or may not be capable of solving tasks above a specific complexity level. Therefore, the IoT device can reduce the complexity of the task or change the type of task to ensure that it is not excluding some genuine devices from communicating therewith whilst continuing to mitigate the risk or likelihood of a DoS attack. Alternatively, the IoT device can increase the complexity of the task or change the type of task to attempt to prevent rogue devices from undertaking a DoS attack thereon.

Furthermore, incorrect or invalid solutions may be discarded by the IoT device (e.g. silently or with an error code). Such functionality prevents that the task will be discarded in case a rogue device spams the IoT device with spoofed answers pretending to be from a genuine user that is currently solving the task.

At Step 308, if the proposed solution is correct or a trust threshold is reached, the IoT device may undertake a negotiation protocol with the remote device. For example, the negotiation protocol may include exchanging cryptographic keys, timing data or channel data.

At Step 309, the remote device may not engage in the negotiation protocol with the IoT device, and may transmit a request to connect with the IoT device as part of a DoS attack as at Step 304.

At Step 310, the IoT device and remote device are connected, and may, for example, exchange secure communications between each other. Additionally, or alternatively, the IoT device 1 may perform a requested function as part of the request to connect.

At Step 312, the connection may be terminated and the IoT device may, at Step 313, repeat the method 300. At END 314, the method completes.

The above techniques, whereby a task is set by an IoT device before connecting to another device may be used in battery powered IoT devices in infrastructures where the batteries cannot readily be replaced, for example due to budget constraints or due to the physical location of such devices (e.g. air pollution sensors, structural sensors in bridges etc.) or where the depletion of a battery or overloading of the IoT devices resources would create security/safety risks (e.g. in healthcare monitor sensors; drug monitoring sensors, alarm system sensors etc.)

Whilst the IoT devices above are described as being in wireless communication with data processing devices remote therefrom, the techniques may be used in IoT devices in wired communication with data processing devices.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

As will be appreciated from the foregoing specification, techniques are described for mitigating or reducing the likelihood a denial of service attack on a first device by second device.

In embodiments the at least one trust credential relates to one or more partial solutions generated by the second device and/or wherein the at least one trust credential relates to a device identifier of the second device.

Furthermore, the first device may establish a connection with the second device responsive to a successful verification, wherein establishing a connection may comprise: performing, at the first device, a function requested by the second device.

In embodiments, establishing a connection may comprise undertaking a negotiation protocol between the first device and the second device, wherein the negotiation protocol may involve exchanging connection data between the first device and the second device.

The connection data may include one or more of: synchronisation data and authorisation data, wherein the synchronisation data may be derived from the solution to the first task, and wherein the synchronisation data may comprise timing data and/or channel data.

In embodiments, the first task to be solved may be provisioned on the first device. In alternative embodiments, the first task may be generated on the first device, wherein generating the first task to be solved may comprise: transforming a data input to provide a transformed value, and wherein the data input may comprise an n-bit number and/or the device identifier of the second device.

Furthermore, generating the first task to be solved may comprise: defining data to be generated by the second device and/or defining a challenge-response test to be solved by a user interacting with the second device, wherein the challenge-response test requires user input to solve a completely automated public Turing test to tell computers and humans apart (CAPTCHA).

In embodiments, the first task to be solved may have a specified validity period, as defined, for example, by a timestamp.

The method may further comprise: setting a complexity of the first task based on one or more of: an attribute of the first device, an attribute of the second device, and an attribute of one or more communications received at the first device, whereby an attribute of the second device may include a trust threshold associated with the second device.

Setting the task complexity may comprise one or more of: modifying the length of the data to be generated by the second device and modifying the validity period of the first task.

In some embodiments the complexity of the second task may be lower than that of the first task, or the complexity of the second task may be higher than that of the first task, whilst the second task may also be different to that of the first task.

In some embodiments, verifying the second communication may comprise checking that the proposed solution is correct or checking that the trust threshold for the second device is reached, wherein the trust threshold may be reached based on or in response to receiving one or more of the trust credentials from the second device.

The first device may distribute information relating to the second device to one or more devices in communication therewith.

Furthermore, the first communication may comprise one of a broadcast communication and a unicast communication, wherein transmitting the first communication may occur in response to detecting, at the first device, a fifth communication from the second device, wherein the fifth communication may comprise one of a broadcast communication and a unicast communication.

In embodiments, a solution to the first or second tasks may involve the second device solving cuckoo cycles.

The invention claimed is:

1. A method for mitigating a power-denial of service attack on a first device by a second device, the method comprising:
transmitting, from the first device to the second device, a first communication comprising a first task to be solved by the second device before establishing a connection between the first device and second device, where the first task requires a solution comprising a first pattern of bits to be returned;
receiving, at the first device from the second device, a second communication comprising at least one trust credential comprising one or more incomplete solutions for the first task generated by the second device, where the one or more incomplete solutions each comprise bits in a pattern different from the first pattern of bits;
verifying, at the first device, whether a trust threshold for the second device is reached based on or in response to the one or more incomplete solutions for the first task;
responsive to a successful verification, establishing a connection between the first device and second device.

2. The method according to claim 1, wherein the at least one trust credential further comprises a device identifier of the second device.

3. The method according to claim 1, wherein establishing a connection comprises one or more of:
performing, at the first device, a function requested by the second device and undertaking a negotiation protocol between the first device and the second device.

4. The method according to claim 3, wherein the negotiation protocol comprises exchanging connection data between the first device and the second device.

5. The method according to claim 4, wherein the connection data includes one or more of: synchronisation data and authorisation data.

6. The method according to claim 5, wherein the synchronisation data is derived from the solution to the first task or wherein the synchronisation data comprises timing data and/or channel data.

7. The method according to claim 1, further comprising: generating, at the first device, the first task to be solved.

8. The method according to claim 7, wherein generating the first task to be solved comprises one or more of:
transforming a data input to provide a transformed value, defining data to be generated by the second device and defining a challenge-response test to be solved by a user interacting with the second device.

9. The method according to claim 8, wherein the data input comprises an n-bit number or the device identifier of the second device.

10. The method according to claim 1, the method further comprising:
setting a complexity of the first task based on one or more of: an attribute of the first device, an attribute of the second device, and an attribute of one or more communications received at the first device.

11. The method according to claim 10, wherein setting the task complexity comprises one or more of: modifying the length of the data to be generated by the second device and modifying the validity period of the first task.

12. The method according to claim 1, wherein the complexity of the second task is lower than that of the first task or wherein the complexity of the second task is higher than that of the first task.

13. The method according to claim 1, wherein the first device distributes information relating to the second device to one or more devices in communication therewith.

14. The method according to claim 1, wherein a solution to the first or second tasks involves the second device solving cuckoo cycles.

* * * * *